(12) United States Patent
Miller et al.

(10) Patent No.: US 6,267,482 B1
(45) Date of Patent: Jul. 31, 2001

(54) SAFETY VEST

(75) Inventors: Whitney W. Miller, Eden Prairie; Wlodek Machaj, Bloomington, both of MN (US)

(73) Assignee: General Security Services Corporation, Minneapolis, MN (US)

(*) Notice: Subject to any disclaimer, the term of this patent is extended or adjusted under 35 U.S.C. 154(b) by 0 days.

(21) Appl. No.: 09/239,266

(22) Filed: Jan. 29, 1999

(51) Int. Cl.$^7$ ........................................ F21V 8/00
(52) U.S. Cl. .................. 362/103; 362/108; 362/570; 362/555
(58) Field of Search .................. 362/103, 104, 362/105, 106, 107, 108, 570

(56) References Cited

U.S. PATENT DOCUMENTS

| | | |
|---|---|---|
| 3,153,745 | 10/1964 | Gurian et al. . |
| 4,231,079 | 10/1980 | Heminover . |
| 4,328,533 | 5/1982 | Paredes . |
| 4,709,307 | 11/1987 | Branom . |
| 4,774,642 | 9/1988 | Janko et al. . |
| 4,812,953 | 3/1989 | Ask et al. . |
| 4,839,777 | 6/1989 | Janko et al. . |
| 5,070,436 | 12/1991 | Alexander et al. . |
| 5,128,843 | 7/1992 | Guritz . |
| 5,249,106 | 9/1993 | Barnes et al. . |
| 5,469,342 | 11/1995 | Chien . |
| 5,575,554 | 11/1996 | Guritz . |
| 5,690,411 | 11/1997 | Jackman . |
| 5,709,464 | 1/1998 | Tseng . |
| 6,146,006 | * 11/2000 | Cross .................. 362/555 |

* cited by examiner

Primary Examiner—Sandra O'Shea
Assistant Examiner—David Hobden
(74) Attorney, Agent, or Firm—Merchant & Gould, P.C.

(57) ABSTRACT

A safety garment having reflective properties and a multiple light assembly for lighting the safety garment. The reflective characteristics of the garment are carried out by the reflective material securely positioned on the garment. An electrical assembly is attached to the garment and comprises a battery, the multiple light assembly and a switch. The multiple light assembly is supported by the garment and sandwiched between the garment and the reflective material, making the multiple light assembly invisible when the multiple light assembly is not receiving power.

10 Claims, 7 Drawing Sheets

SAFETY VEST

BACKGROUND OF THE INVENTION

1. Field of the Invention

The present invention relates in general to illuminated articles and, more specifically, therefore illuminated garments and other articles of wearing apparel.

2. Description of the Prior Art

Illuminated garments and other wearing apparel have been previously made with reflective portions of materials, which are observed by motorists during twilight, nighttime, and overcast daytime, when vehicle headlights are turned on. These garments have also been provided with a number of lights, such as LED's, which are mounted on each article, and connected to an electrical circuit housed within or mounted on the article of wearing apparel. The circuit includes a power source, such as a battery, which is also mounted on the article of wearing apparel. Some garments and other articles of wearing apparel have been manufactured with a combined light and reflective material structure.

Typically, a battery pack is mounted within the article or garment and connected by a flexible electrical circuit board attached to the garment in a predetermined design or shape on the garment. A number of LED's are electrically connected to the circuit board and, typically, protrude through apertures formed in the outer surface of the garment for ease of disability. A problem with garments wherein LEDs protrude through an aperture is that the LEDs can be damaged or broken as a result of being exposed. In addition, some garments and other articles of wearing apparel may be of such a stylish nature that visibility of a circuit board and LED's protruding through apertures within the garment are not desirable. However, such stylish garments which may be worn by joggers, runners, walkers, cyclists, etc. still need to include reflective materials and lights.

There is a need for a garment utilizing LEDs for illuminating the garment. The garment and LED combination needs to be configured in such a manner that the LEDs do not detract from the style of the garment. One possibility is to configure the garment such that the LED's are not openly displayed. In the past, the problem with this configuration is that because the LEDs are not particularly strong, any type of cover that is not translucent is ineffective. A reflective cover simply calls greater attention to the LEDs and does not provide the LEDs with the ability to be discretely positioned on the garment when the LEDs are not powered up. One solution would be to add larger and stronger lights that can shine through non translucent material creating a glowing effect. The problem with such a configuration is that stronger lights may cause the garment on which it is positioned to burn or melt. If a stronger light does not affect the garment, it may surely cause the person wearing the garment to feel the heat coming off the light. Another problem is the a larger battery will be required to supply power to stronger lights. A larger battery is not desired because it causes the garment to be heavy, bulky and can not be positioned on the garment in a discrete manner. In order for a garment utilizing lights for illuminating the garment to be effective, the lights need to be low energy consumption and combined with the garment in a configuration that solves the above mentioned problems.

SUMMARY OF THE INVENTION

The present invention comprises a safety garment having reflective properties and a multiple light assembly for lighting the safety garment. The garment is made of a lightweight mesh material and may be manufactured as one piece. The reflective characteristics of the garment are carried out by reflective material being securely positioned on the garment. An electrical assembly is also attached to the garment and comprises a battery, the multiple light assembly and a switch. The multiple light assembly is supported by the garment and sandwiched between the garment and the reflective material. The switch is also supported by the garment in a closeable pocket and controls supply of electrical energy from the battery to the multiple light assembly. The reflective material is comprised of a polyvinyl chloride and has a first side and a second side, wherein the first side of the reflective material is attached to the garment along the edges of the reflective material. The first side of the reflective material is embossed with micro prism dyes that cause the first side to be translucent to light shining underneath the first side of the reflective material, thereby allowing the light to shine through. The micro prism dyes attached to the first side of the reflective material causes the second side of the reflective material to be non-translucent so that shining light onto the second side causes the light to be reflected. It is the shape of the prism and the manner in which the prisms are attached to the first side of the reflective material that causes the second side to reflect light.

GENERAL DESCRIPTION OF THE INVENTION

The present invention relates to a safety garment having reflective properties and a multiple light assembly attached thereto that illuminates when power is supplied. In one embodiment, the lights are illuminated intermittently. The material that comprises the safety garment may be any one of or a combination of the plurality of different materials generally used for clothing garments. For some embodiments, the material that comprises the safety garment will depend on the weather conditions. In the embodiment described herein, the safety garment is comprised of a lightweight mesh material. Further, it is contemplated that the safety garment can be implemented in any form of clothing to be worn. In the embodiment described herein, the safety garment is implemented as a vest. The vest is preferably a one piece item. However, it is contemplated that vests of a varying number of pieces can be manufactured. In the embodiment described herein, the vest generally has one size fits all capability. However, it is contemplated that the vest may also come in specific sizes in a manner similar to garments in the industry.

The one size fits all capability is adapted from the expandable and retractable waist-line portion of the bottom section of the vest that is implemented by the vest waist-line having two expandable and retractable sections on each side of the vest. Each expandable and retractable section is comprised of two overlapping tab portions. One of the tabs of the overlapping tab portions having a male piece of a VELCRO connector attached thereto and the other tab having a female piece of the VELCRO connector attached thereto. It is also contemplated that the expandable retractable section can be implemented with other connection systems and is not limited to an overlapping tab portion. For example, the expandable and retractable section may be implemented by a belt connector, a snap fastener connection system having single female fasteners for interacting with a plurality of male fasteners, or a standard button assembly having a plurality of buttons for mating with a single button slit.

The reflective properties of the safety garment are implemented by securely attaching reflective material to the safety garment. In one embodiment, the reflective material is comprised of elongated strips having a first side and a second side, wherein the first side of the reflective material is attached to the garment and has characteristics that allow light to shine through the reflective material and the second side of the reflective material has reflective characteristics. The safety garment also includes an electrical power assembly that is comprised of a battery and switch for controlling supply of electrical energy from the battery to the multiple light assembly. The electrical power supply assembly is supported by the garment and supplies energy to the multiple light assembly which is positioned underneath the elongated strips of reflective material. Because of the characteristics of the reflective material, when power is applied to the multiple light assembly, each of the individual LEDs comprising the multiple light assembly is visible through the reflective strip. Conversely, when power is not being applied to the multiple light assembly, the LEDs comprising the multiple light assembly cannot be seen. The characteristics of the reflective material is such that the individual lights comprising the multiple light assembly are not visible through the reflective strip when power is not being applied to the multiple light assembly.

DETAILED DESCRIPTION OF THE PREFERRED EMBODIMENT

As required, a detailed embodiment of the present invention is disclosed herein. However, it is to be understood that the disclosed embodiment is merely exemplary of the invention, which may be embodied in various forms. Therefore, specific structural and functional details disclosed herein are not to be interpreted as limiting but rather as the basis for the claims and as a representative basis for teaching one skilled in the art to employ the present invention in virtually any appropriately detailed system.

Figure 1:
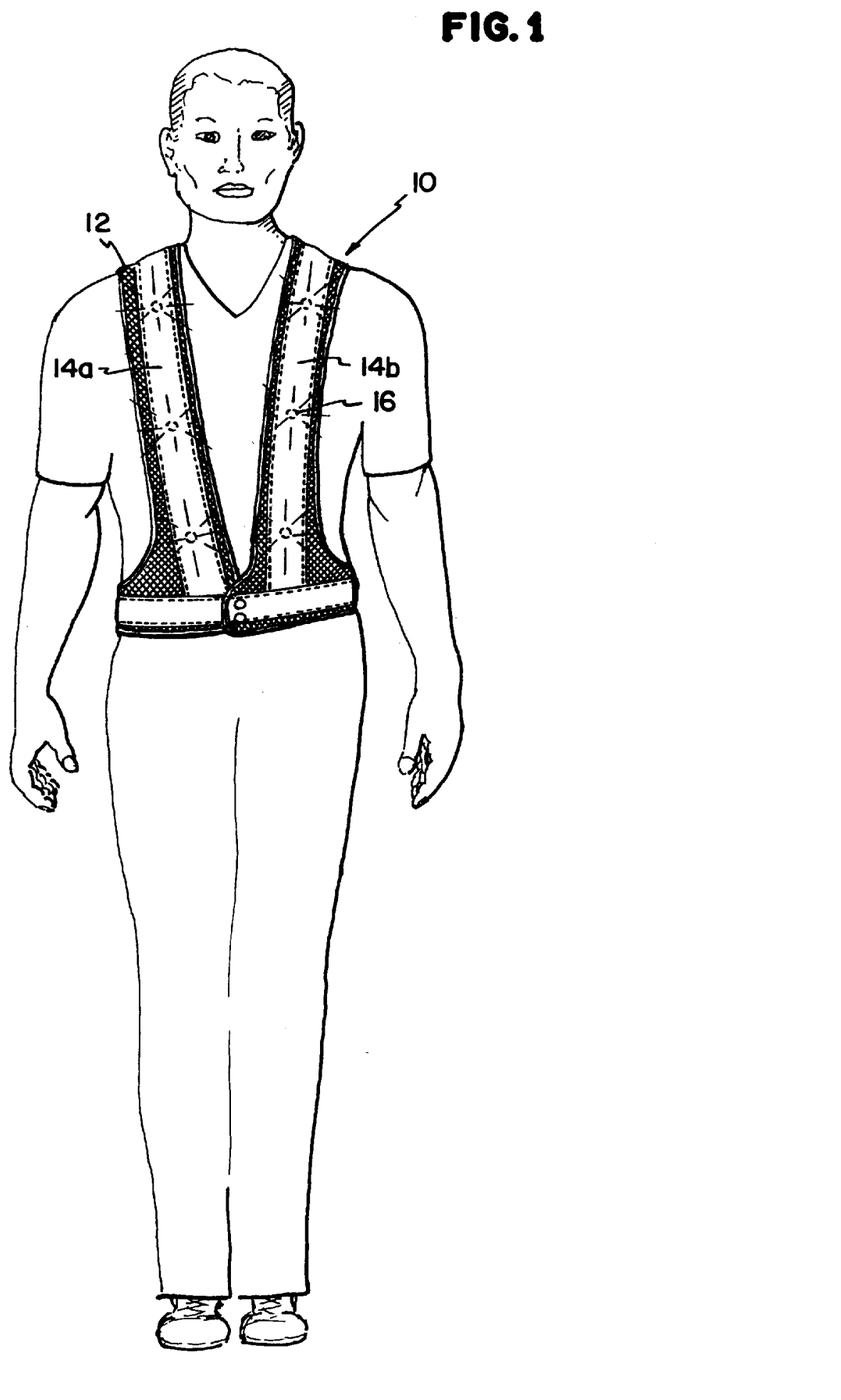
FIG. 1 is a front view of a person wearing the safety garment.
Figure 2:
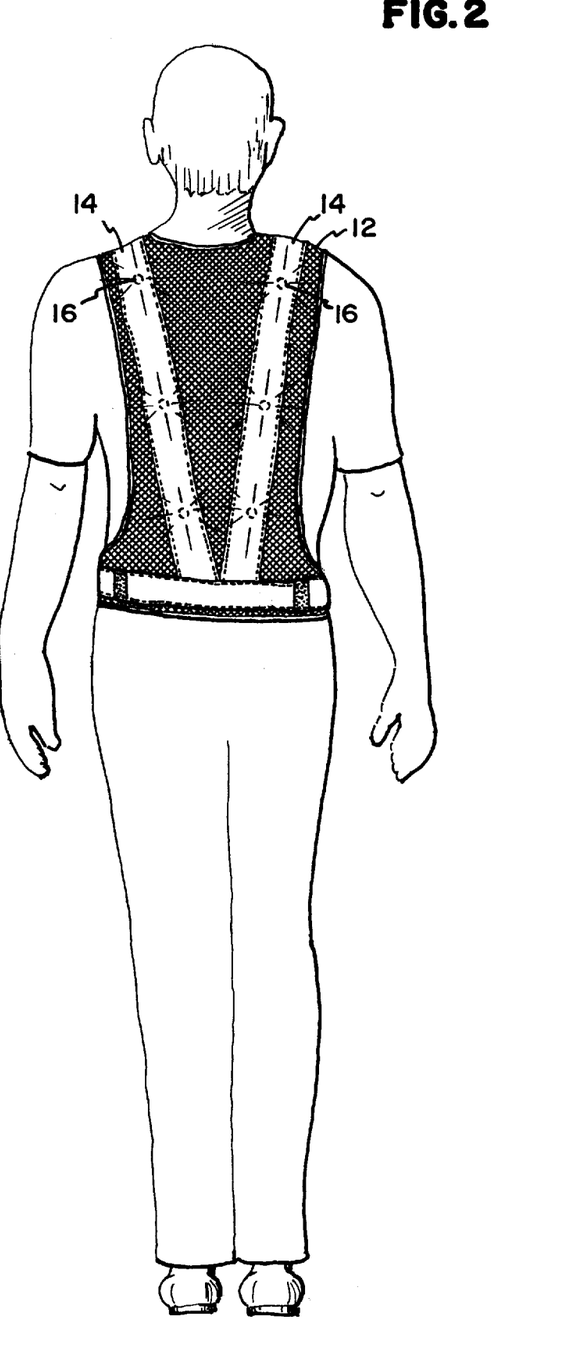
FIG. 2 is a back view of a person wearing the safety garment.

Referring to the drawings, a preferred embodiment of the safety garment implemented as a safety garment 10 is illustrated in the drawings. In FIGS. 1 and 2, the safety garment 10 is shown being worn by a person. The illustrated preferred embodiment of the invention includes a vest 12 having reflective and lighting characteristics wherein the lighting characteristics are performed by a multiple light assembly. The vest 12 is comprised of a mesh material and has reflective material 14 securely positioned thereto. It is to be understood that the safety garment 10 can be manufactured in a number of different shapes so that it can be worn as an article of clothing by a person. The illustration of the safety garment 10 as a vest is not intended to limit the safety garment to vests.

As FIGS. 1 and 2 illustrate, strips of reflective material are located on the right 14a, left 14b, and bottom 14c of the vest on both the front and back of the vest 12. The reflective strips 14 are securely positioned on the vest garment 12. In the preferred embodiment, the reflective strips 14 are sewn to the vest 12 along the edges of the reflective material 14. Underneath the strips of reflective material 14, LEDs 16 which comprise the multiple light assembly are equally spaced underneath the strips of reflective material.

The vest garment 12 illustrated in FIGS. 1 and 2 is a one-piece garment. It has fasteners 18 for closing the vest and an adjustable waist line section (not shown) that is expanded or retracted by a fastening system. It is to be understood that the fasteners 18 and fastening system can be snap fasteners, buckles, buttons, VELCRO or any other fastener assembly. Specifically, fasteners 18, as FIG. 1 illustrates, are snap fasteners. Fasteners 18 need only provide a means for the safety garment 10 to open and close. In the preferred embodiment, the fastener assembly for expanding or retracting the waist line section is comprised of a VELCRO fastening system. The fastener assembly needs to at least allow for an increase or decrease in the circumference of the waistline section of the safety garment 10.

The safety garment 10 also includes an electrical assembly attached to the garment wherein the electrical assembly includes a battery, a switch, and a multiple light assembly supported by the garment. The multiple light assembly is sandwiched between the garment and the reflective material. A switch and battery are supported by the garment. The switch controls the supply of electrical energy from the battery to the multiple light assembly. In the preferred embodiment, the multiple light assembly is comprised of a plurality of LEDs, wherein there are fine LEDs equally spaced apart underneath each reflective strip panel 14a, 14b, for a total of 20 LEDs.

In the preferred embodiment, the strips of reflective material 14 are comprised of a super flexible polyvinyl chloride material. The polyvinyl chloride reflective material is embossed with micro prism dyes. In the preferred embodiment, the micro prism dyes are embossed at approximately 20,000 prisms per square inch. The polyvinyl chloride reflective material is manufactured by Stimsonite of Chicago, Ill. The reflective material 14 has a first side and a second side wherein the first side of the reflective material has characteristics that allow light to shine therethrough. The second side of the reflective material 14 has reflective characteristics and does not allow light to shine through the reflective material 14. The reflective material 14 used to implement the present invention has its first side embossed with the micro prism dyes. It is the shape of the micro prisms that cause the first side to be translucent to light shining onto the first side and allows the light shining onto the first side to shine through the reflective material and display the LEDs 16 positioned thereunder. The characteristics of the reflective material 14 that allows light to shine through its first side, causes the second side of the reflective material to be non-translucent. The second side of the reflective material 14 is smooth, opaque and reflective. Shining light onto the second side of the reflective material 14 results in the light being reflected.

Figure 3:
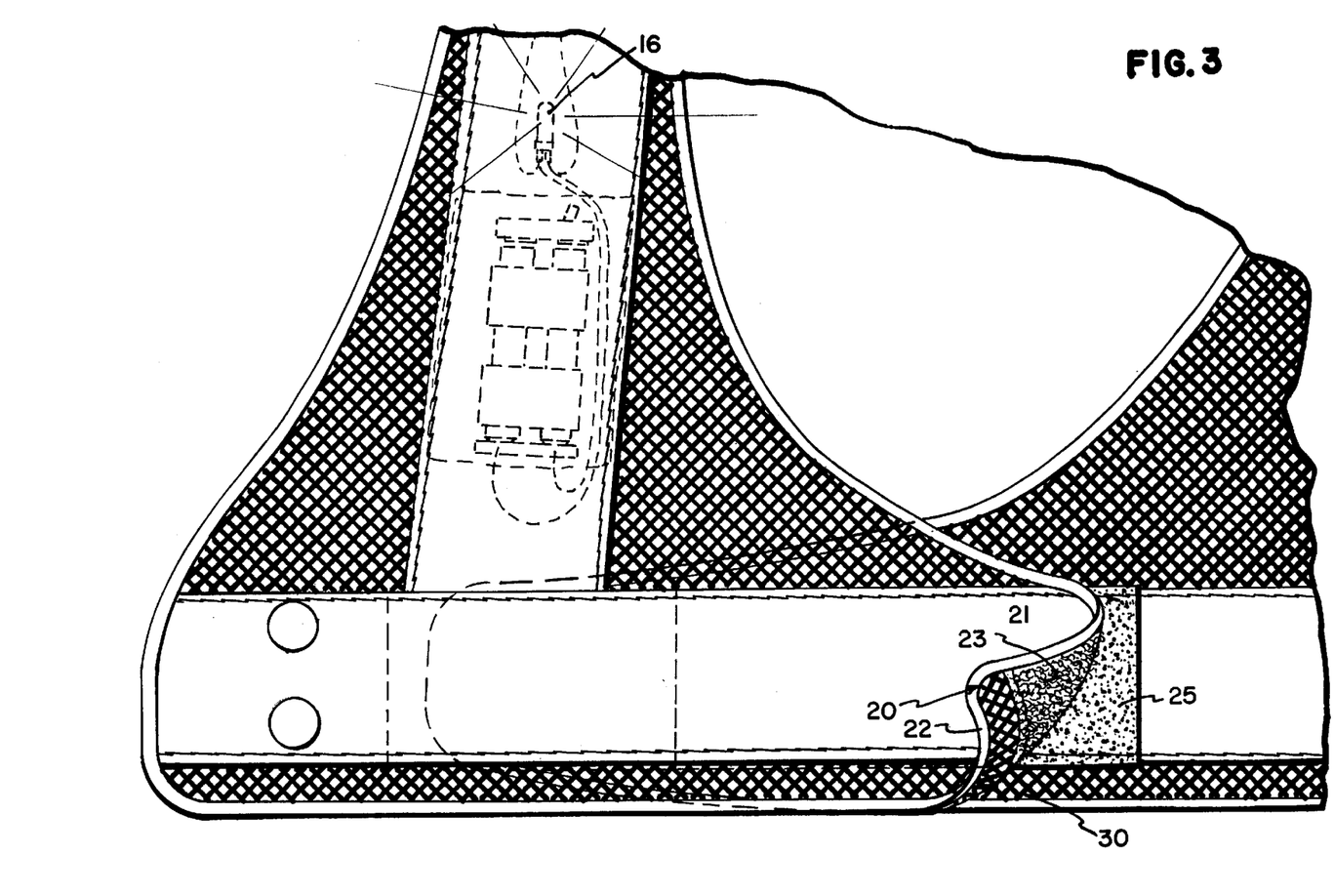
FIG. 3 is a partial prospective view of the side of the vest illustrating the VELCRO side tabs used for changing the size of the vest.

FIG. 3 illustrates a side cutaway view of the safety garment 10 wherein the outside tab portion 20 of the overlapping tab portions and the inside tab portion 30 of the overlapping tab portions of the safety garment 10 are illustrated. The outside tab portion 20 has a first and second sides. The first side 21 is the exterior of the outside tab portion 20. The second side 22 has a female VELCRO piece 23 attached thereto. The inside tab portion 30 has first and second sides, the first side, which is the side of the outside tab portion that is not touching the body of the person when the safety garment 10 is being worn, has a male VELCRO piece 25 attached thereto. The female 23 and male 25 VELCRO pieces are pieces from a Velcro connection system utilized by the overlapping tab portions to modify the circumference of the waist portion of the safety garment 10. The circumference of the waist portion of the safety garment 10 can be expanded or retracted by moving the outside tab portion 20 forward or backward and connecting the female 23 and male 25 VELCRO pieces of the VELCRO connection system.

Figure 4:
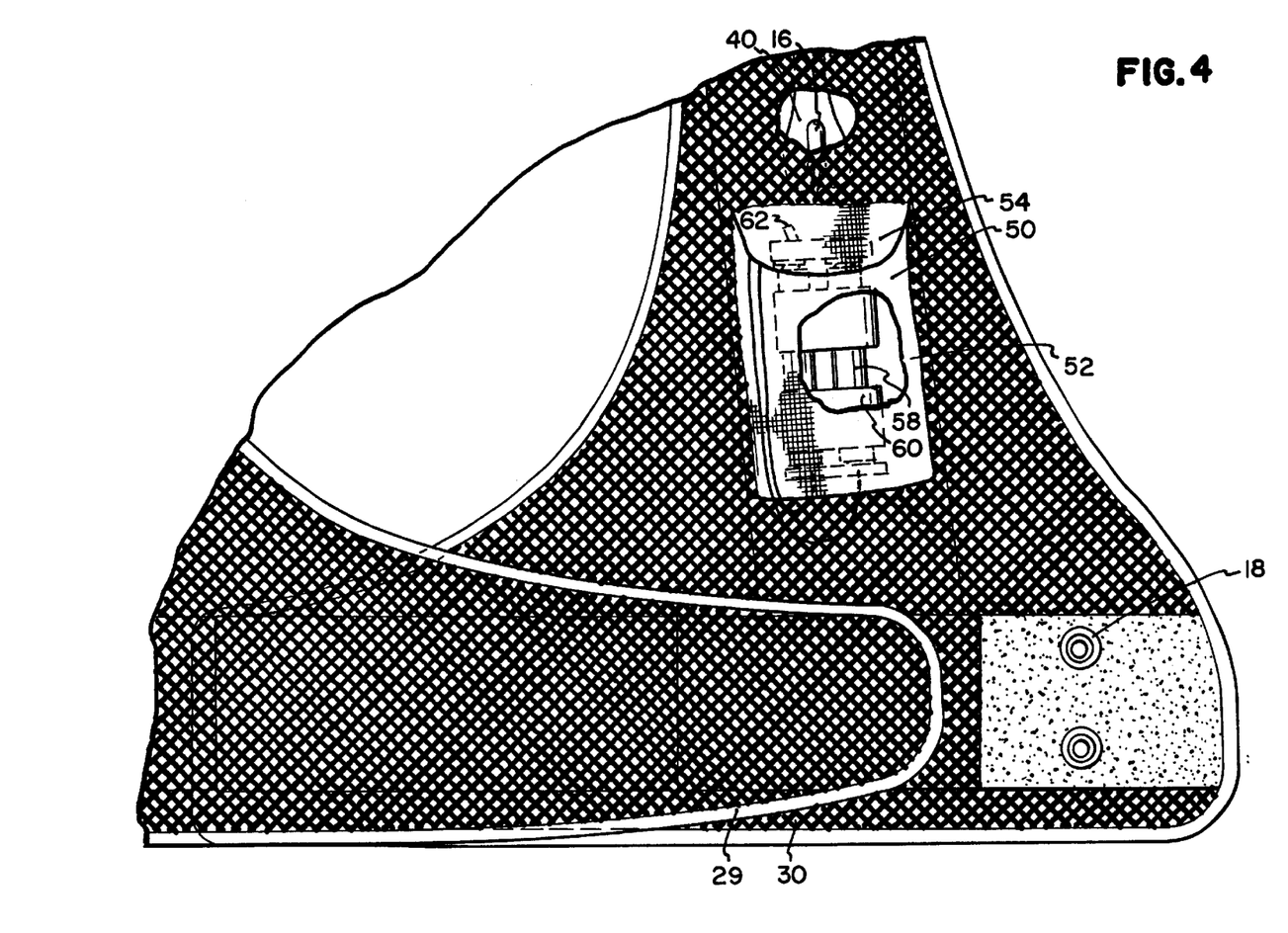
FIG. 4 is a partial prospective view of the side of the vest illustrating the pocket that receives the battery, the switch and the electrical circuit.

FIG. 4 illustrates a cut-away section of the reflective strip 14 wherein a LED 16 from the multiple light assembly is exposed. The LED 16 from the multiple light assembly is positioned securely on a sturdy holding material 40 that supports the LED 16. In the embodiment shown in FIG. 4, the holding material 40 has a horizontal slit (not shown) cut into it and the light 16 slides through the slit and the base of the LED 16 rests within the slit. In the preferred embodiment, the light is a LED 16. It is to be understood that the manner of light emission is not intended to be limited to LEDs, other forms of light emission may be used. The holding material 40 is sandwiched between the vest 12 and the reflective strip 14. The holding material 40 adds stability and ensures that the positioning of each LED 16 in the multiple light assembly remains proper. Each LED 16 within the multiple light assembly is positioned equally spaced on the holding material 40.

FIG. 4 also illustrates the safety garment pocket 50. The safety garment pocket 50 is the housing that receives the battery 58, the battery housing 60 and the on/off switch 62. In the preferred embodiment, the pocket housing 50 includes a pocket body 52 and a pocket closing flap 54. It also houses a printed circuit board assembly that has the electrical circuit (shown in FIG. 7) that controls the supply of electrical energy from the battery 58 to the multiple light assembly. In the preferred embodiment, the electric circuit intermittently supplies electrical energy from the battery 58 to the multiple light assembly.

Figure 5:
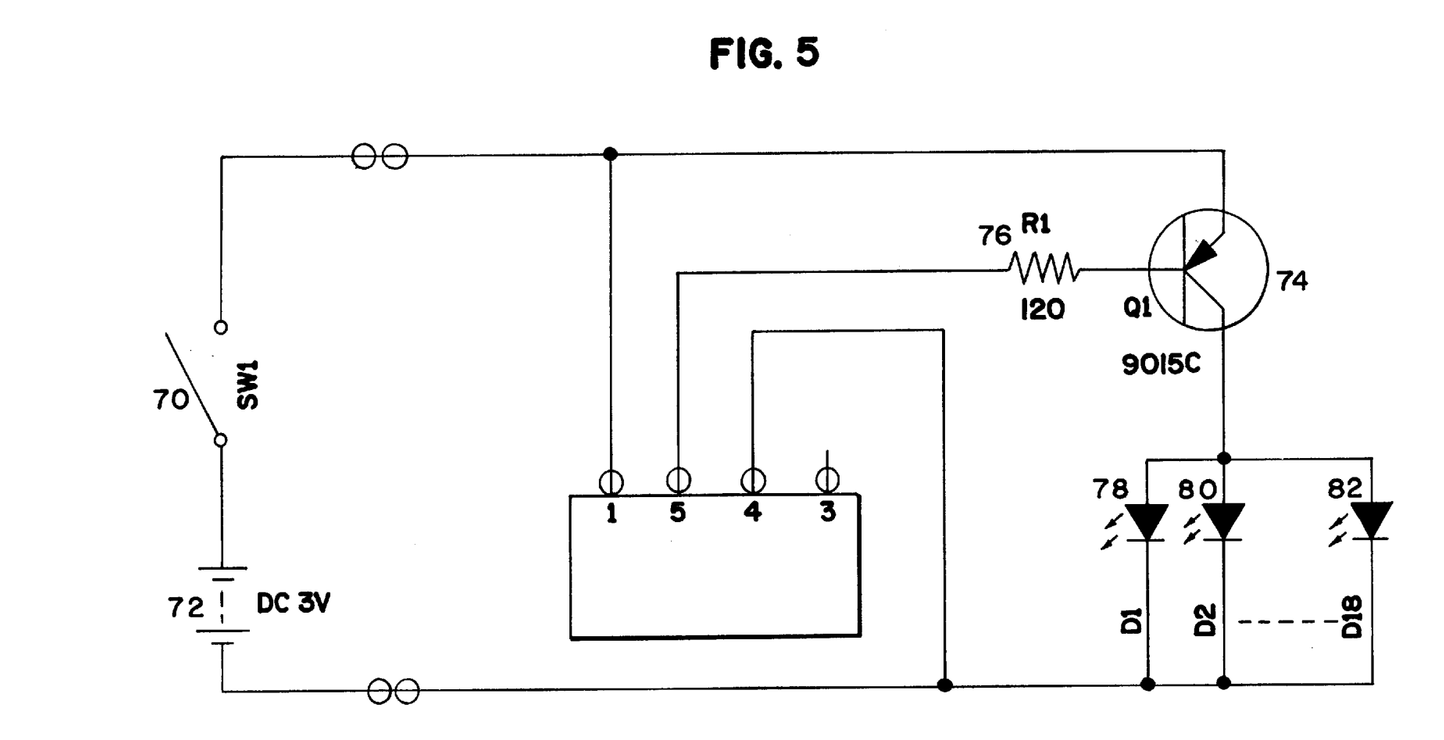
FIG. 5 is a schematic view of the electric circuitry and the battery.

In specific reference to the circuitry that is housed on the printed circuit board assembly, the components of the electrical circuit are illustrated in FIG. 5. When the switch assembly 70 is closed, the battery energy 72 is applied respectively to the blinking light control chip 84 and soon thereafter the LEDs 78, 80 and 82 are flashing. The circuit includes a transistor 74 and a current limiting resister 76 used to turn transistor 74 on and off. When the switch 70 is closed and control chip 84 is powered, current flows through resister 76, turning transistor 74 on which provides the voltage used to drive the light emitting diodes (LEDs) 78, 80 and 82. Preferably, the battery is 3 volts. It is to be understood that the present invention is not to be limited to the electric circuit disclosed herein and illustrated in FIG. 5. It is contemplated that the electrical circuit portion of this invention covers all electrical circuit designs that can control intermittent energy supply to the multiple light assembly.

Figure 6:
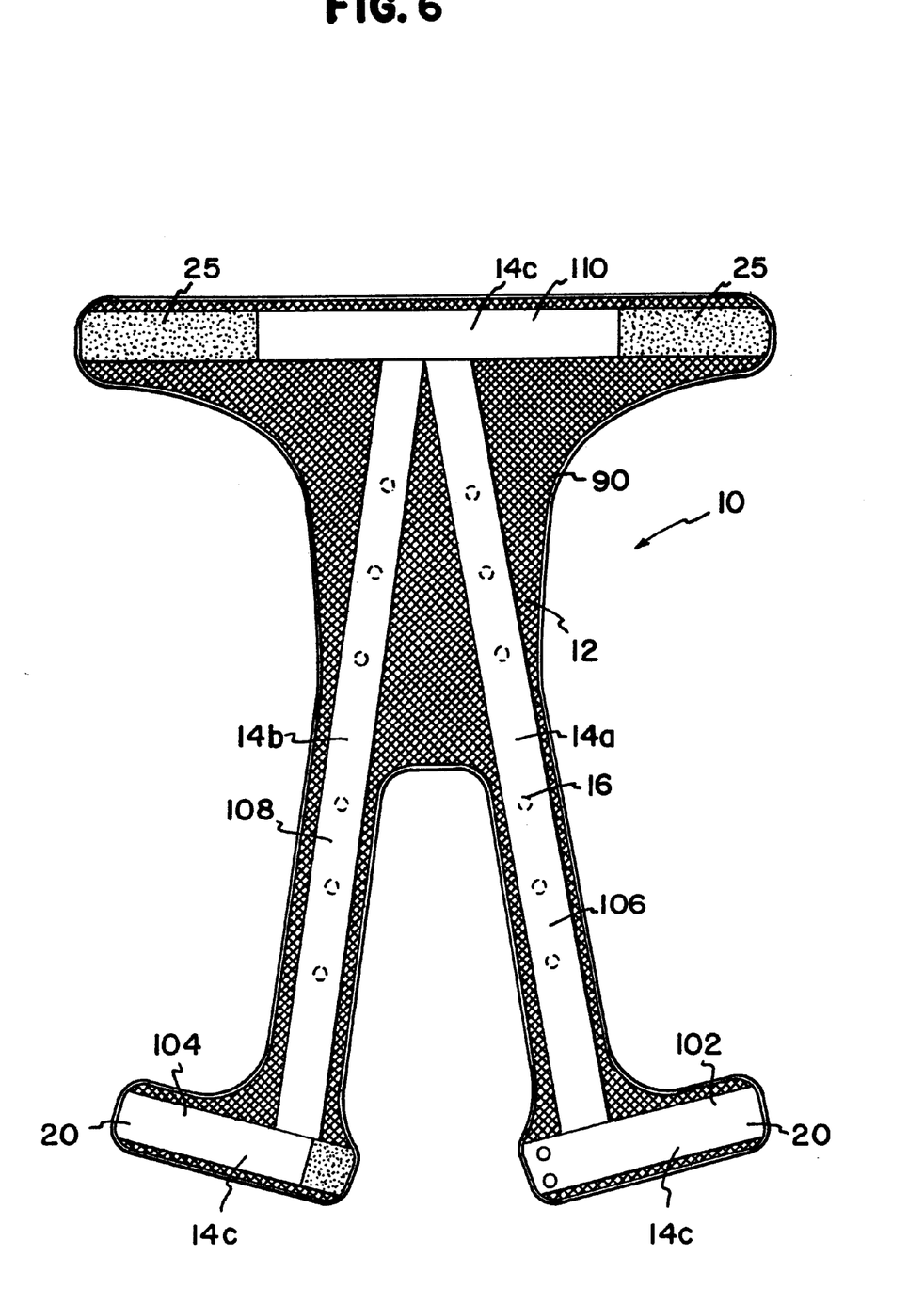
FIG. 6 is a prospective view of the outside of the vest illustrating the one-piece design.

FIG. 6 illustrates the one-piece design aspects of the safety garment 10. As shown in FIG. 6, when the safety garment 10 is laying flat and not being worn by a person, a first side 90 of the safety vest 12 illustrates that the garment is comprised of one piece of mesh 12 having four strips of reflective material 102, 104, 106, 108 and 110 positioned onto the mesh garment 12. FIG. 6 also illustrates the equally-spaced LEDs 16 within the multiple light assembly. The fastener assembly for expanding or retracting the waist-line section also illustrates the male piece 25. The fasteners 18 for closing the vest are also illustrated.

Figure 7:
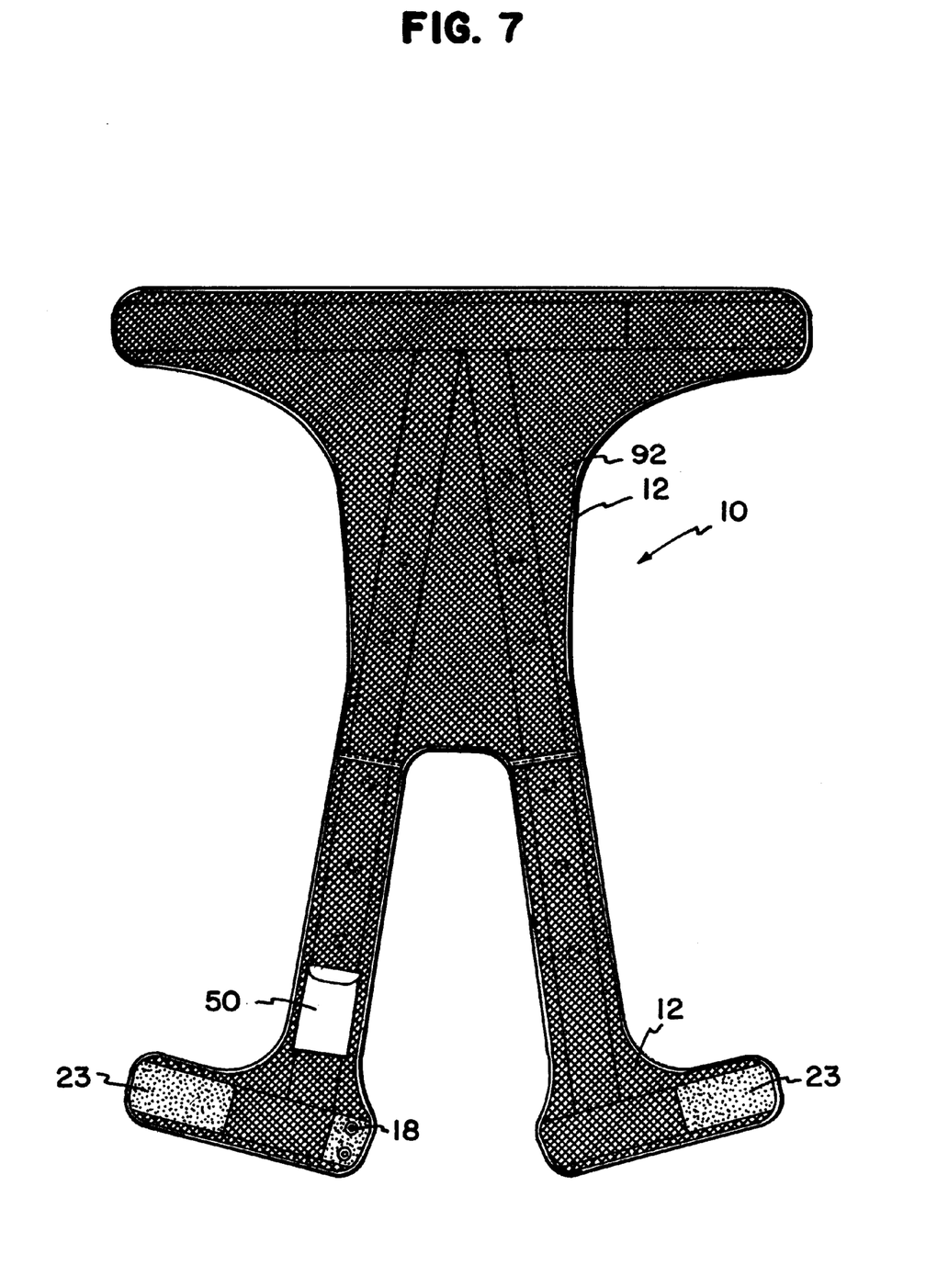
FIG. 7 is a prospective view of the inside of the vest illustrating the one-piece design.

Turning to FIG. 7, the second side 92 of the safety garment 10 is shown. Specifically, the mesh 12 portion of the garment is illustrated along with the female portion 23 of the VELCRO fastening system for expanding or retracting the waist-line section of the safety garment 10. The safety garment pocket 50 is also illustrated in FIG. 7.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A safety garment, reflective and lighted with flashing lights, comprising:

a) a garment made of a mesh;

b) reflective material securely positioned on the garment;

c) an electrical assembly attached to the garment comprising:
  i) a battery supported by the garment:
  ii) multiple light assemblies supported by the garment and sandwiched between the garment and the reflective material;
  iii) a switch supported by the garment for controlling supply of electrical energy from the battery to the multiple light assemblies;

wherein the reflective material has a first side and a second side and is comprised of polyvinyl chloride, the first side of the reflective material embossed with micro prism dyes that cause the first side to be translucent so that shinning light underneath the first side allows the light to shine through and causes the second side to be non-translucent so that shining light onto the second side causes the light to be reflected.

2. A safety garment, as claimed in claim 1, wherein the electrical assembly includes an electrical circuit supported by the safety garment, the electrical circuit intermittently supplying electrical energy from the battery to the multiple light assemblies.

3. A safety garment, as claimed in claim 1, wherein the reflective material are elongated strips comprised of polyvinyl chloride having the first of the reflective material embossed with micro prism dyes that cause the first side to be translucent so that shining light underneath the first side allows the light to shine through and causes the second side to be non-translucent so that shining light onto the second side causes the light to be reflected.

4. A safety garment, as claimed in claim 1, wherein the safety garment is a one-piece vest.

5. A safety garment, as claimed in claim 1, wherein the safety garment has a pocket that receives the battery, the switch and the electric circuit.

6. A safety garment, as claimed in claim 1, wherein the switch includes a battery housing for supporting the battery.

7. A safety garment, as claimed in claim 1, wherein the multiple light assembly is positioned on a holding material, the holding material sandwiched between the garment and the reflective material.

8. A safety vest, having light reflection and light emitting properties, comprising:
 a) a vest;
 b) reflective material attached to the vest;
 c) an electrical assembly attached to the vest comprising:
  i) a battery;
  ii) a multiple light assembly positioned underneath the reflective material;
  iii) a switch supported by the vest for controlling supply of electrical energy from the battery to the multiple light assembly;
 wherein the vest is a one piece garment having an expandable waist-line;
 wherein the reflective material is comprised of a flexible material having a first side and a second side, the first side of the flexible material being embossed with micro prisms, the first side of the reflective material having characteristics that allow light to shine through the reflective material and the second side of the reflective material having characteristics that allow light to be reflected.

9. A safety garment, having light reflection and light emitting properties, comprising:
 a) a garment;
 b) reflective material attached to the garment;
 c) an electrical assembly attached to the garment comprising:
  i) a battery;
  ii) a multiple light assembly positioned underneath the reflective material;
  iii) a switch supported by the garment for controlling supply of electrical energy from the battery to the multiple light assembly;
 wherein the reflective material having a first side and a second side, the first side of the reflective material is embossed with micro prisms and translucent and the second side having a smooth opaque surface that is reflective.

10. A safety garment, as claimed in claim 9,
 wherein the micro prisms embossed on the first side of the reflective material causes the reflective material to be translucent on the reflective material first side and opaque and reflective on the reflective material second side.

* * * * *